US012588032B2

(12) United States Patent
Zhang et al.

(10) Patent No.: US 12,588,032 B2
(45) Date of Patent: Mar. 24, 2026

(54) METHODS AND APPARATUS OF RESOURCE MAPPING AND SIGNALING INDICATION FOR JOINT CORESET FOR ENHANCED PDCCH TRANSMISSION WITH MULTIPLE TRPs

(71) Applicant: LENOVO (BEIJING) LIMITED, Beijing (CN)

(72) Inventors: Yi Zhang, Beijing (CN); Chenxi Zhu, Fairfax, VA (US); Bingchao Liu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 427 days.

(21) Appl. No.: 18/029,268

(22) PCT Filed: Sep. 29, 2020

(86) PCT No.: PCT/CN2020/118808
§ 371 (c)(1),
(2) Date: Mar. 29, 2023

(87) PCT Pub. No.: WO2022/067501
PCT Pub. Date: Apr. 7, 2022

(65) Prior Publication Data
US 2025/0274945 A1 Aug. 28, 2025

(51) Int. Cl.
*H04W 72/23* (2023.01)
*H04L 5/00* (2006.01)

(52) U.S. Cl.
CPC ........... *H04W 72/23* (2023.01); *H04L 5/0005* (2013.01); *H04L 5/0053* (2013.01)

(58) Field of Classification Search
CPC ..... H04W 72/23; H04L 5/0005; H04L 5/0053
See application file for complete search history.

(56) References Cited

U.S. PATENT DOCUMENTS

2020/0120584 A1* 4/2020 Yi ..................... H04W 74/0833
2020/0187171 A1* 6/2020 Hwang ................. H04W 72/23
(Continued)

FOREIGN PATENT DOCUMENTS

CN 111436224 A 11/2019

OTHER PUBLICATIONS

International Searching Authority, "Written Opinion of the International Searching Authority," PCT/CN2020/118808, Jun. 21, 2021, pp. 1-3.

(Continued)

*Primary Examiner* — Christine Ng
(74) *Attorney, Agent, or Firm* — Kunzler Needham & Hilton

(57) ABSTRACT

Methods and apparatus of resource mapping and signaling indication for joint CORESET for enhanced PDCCH transmission with multiple TRPs are disclosed. The apparatus includes: a processor that generates a joint Control Resource Set (CORESET) configuration for configuring a joint CORESET based on a plurality of CORESETs for a Physical Downlink Control Channel (PDCCH) transmission, wherein the joint CORESET comprises a plurality of resources from the CORESETs mapped therein based on a resource mapping scheme; and a transmitter that transmits a configuration signaling for the joint CORESET configuration, and transmits the PDCCH on the resources of the joint CORESET.

20 Claims, 7 Drawing Sheets

---

902
generating, by a processor, a joint Control Resource Set (CORESET) configuration for configuring a joint CORESET based on a plurality of CORESETs for a Physical Downlink Control Channel (PDCCH) transmission, wherein the joint CORESET comprises a plurality of resources from the CORESETs mapped therein based on a resource mapping scheme 904
transmitting, by a transmitter, a configuration signaling for the joint CORESET configuration 906
transmitting, by the transmitter, the PDCCH on the resources of the joint CORESET

(56)                References Cited

U.S. PATENT DOCUMENTS

| | | | |
|---|---|---|---|
| 2020/0221429 A1* | 7/2020 | Li | H04L 5/0053 |
| 2020/0228966 A1* | 7/2020 | Xu | H04W 72/23 |
| 2021/0092762 A1* | 3/2021 | Choi | H04W 72/23 |
| 2022/0039072 A1* | 2/2022 | Babaei | H04L 5/0053 |
| 2022/0311579 A1* | 9/2022 | Zhang | H04B 7/0695 |
| 2023/0156719 A1* | 5/2023 | Mozaffari | H04W 72/1263 |
| | | | 370/329 |

OTHER PUBLICATIONS

Qualcomm Incorporated, Summary #2 of email discussion [102-e-NR-feMIMO-02], 3GPP TSG RAN WG1 Meeting #102-e, R1-2007181, Aug. 17-28, 2020, pp. 1-13, e-Meeting.

LG Electronics, Enhancements on Multi-TRP for PDCCH, PUCCH and PUSCH, 3GPP TSG RAN WG1 #102-e, R1-2006597, Aug. 17-28, 2020, pp. 1-6, e-Meeting.

Qualcomm Incorporated, Summary #1 of email discussion [102-e-NR-feMIMO-02], 3GPP TSG RAN WG1 Meeting #102-e, R1-2007180, Aug. 17-28, 2020, pp. 1-63, e-Meeting.

Lenovo, Motorola Mobility, Enhancements on Multi-TRP for PDCCH, PUCCH, and PUSCH, 3GPP TSG RAN WG1 #102-e, R1-2005821, Aug. 17-Aug. 28, 2020, pp. 1-7, e-Meeting.

\* cited by examiner

100

104

102

104

102 backhaul backhaul 104a     backhaul     104b 102a     102b

700B

704
CORESET 2

REG from TRP 1

REG from TRP 2

Frequency Domain/PRBs

702
CORESET 1

OFDM     OFDM
Symbol 1 Symbol 2

METHODS AND APPARATUS OF RESOURCE MAPPING AND SIGNALING INDICATION FOR JOINT CORESET FOR ENHANCED PDCCH TRANSMISSION WITH MULTIPLE TRPs

FIELD

The subject matter disclosed herein relates generally to wireless communication and more particularly relates to, but not limited to, methods and apparatus of resource mapping and signaling indication for joint Control Resource Set (CORESET) for enhanced Physical Downlink Control Channel (PDCCH) transmission with multiple Transmit and Receive Points (TRPs).

BACKGROUND

The following abbreviations and acronyms are herewith defined, at least some of which are referred to within the specification:

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Control Channel Element (CCE), Control Element (CE), Control Resource Set (CORESET), Downlink Control Information (DCI), Frequency-Division Multiplexing (FDM), Frequency Division Multiple Access (FDMA), Identification (ID), Media Access Control (MAC), Physical Resource Block (PRB), Resource Block (RB), Resource-Element Group (REG), Radio Resource Control (RRC), Single Frequency Network (SFN), System Frame Number (SFN), Time-Division Multiplexing (TDM), Transmit Receive Point (TRP), Frequency Range 1 (FR1), Frequency Range 2 (FR2), Synchronization Signal (SS), Transmission Configuration Indication (TCI), Frequency-Division Multiplexed (FDMed), Time-Division Multiplexed (TDMed), Space Division Multiplexed (SDMed).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHZ) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (E-PDCCH) allows exploitation of the additional resources to improve PDCCH transmission reliability and robustness. Multiple transmissions of the E-PDCCH may be transmitted from a same TRP or some different TRPs.

SUMMARY

Methods and apparatus of resource mapping and signaling indication for joint CORESET for enhanced PDCCH transmission with multiple TRPs are disclosed.

According to a first aspect, there is provided an apparatus, including: a processor that generates a joint Control Resource Set (CORESET) configuration for configuring a joint CORESET based on a plurality of CORESETs for a Physical Downlink Control Channel (PDCCH) transmission, wherein the joint CORESET comprises a plurality of resources from the CORESETs mapped therein based on a resource mapping scheme; and a transmitter that transmits a configuration signaling for the joint CORESET configuration and transmits the PDCCH on the resources of the joint CORESET.

According to a second aspect, there is provided an apparatus, including: a receiver that receives a configuration signaling for a joint Control Resource Set (CORESET), wherein the joint CORESET is configured based on a plurality of CORESETs for a Physical Downlink Control Channel (PDCCH) transmission, and the joint CORESET comprises a plurality of resources from the CORESETs mapped therein based on a resource mapping scheme; and a processor that derives a joint CORESET configuration for the joint CORESET from the configuration signaling; wherein the receiver further receives the PDCCH that is transmitted on the resources of the joint CORESET according to the joint CORESET configuration.

According to a third aspect, there is provided a method, including: generating, by a processor, a joint Control Resource Set (CORESET) configuration for configuring a joint CORESET based on a plurality of CORESETs for a Physical Downlink Control Channel (PDCCH) transmission, wherein the joint CORESET comprises a plurality of resources from the CORESETs mapped therein based on a resource mapping scheme; transmitting, by a transmitter, a configuration signaling for the joint CORESET configuration; and transmitting, by the transmitter, the PDCCH on the resources of the joint CORESET.

According to a fourth aspect, there is provided a method, including: receiving, by a receiver, a configuration signaling for a joint Control Resource Set (CORESET), wherein the joint CORESET is configured based on a plurality of CORESETs for a Physical Downlink Control Channel (PDCCH)

transmission, and the joint CORESET comprises a plurality of resources from the CORESETs mapped therein based on a resource mapping scheme; deriving, by a processor, a joint CORESET configuration for the joint CORESET from the configuration signaling; and receiving, by the receiver, the PDCCH that is transmitted on the resources of the joint CORESET according to the joint CORESET configuration.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
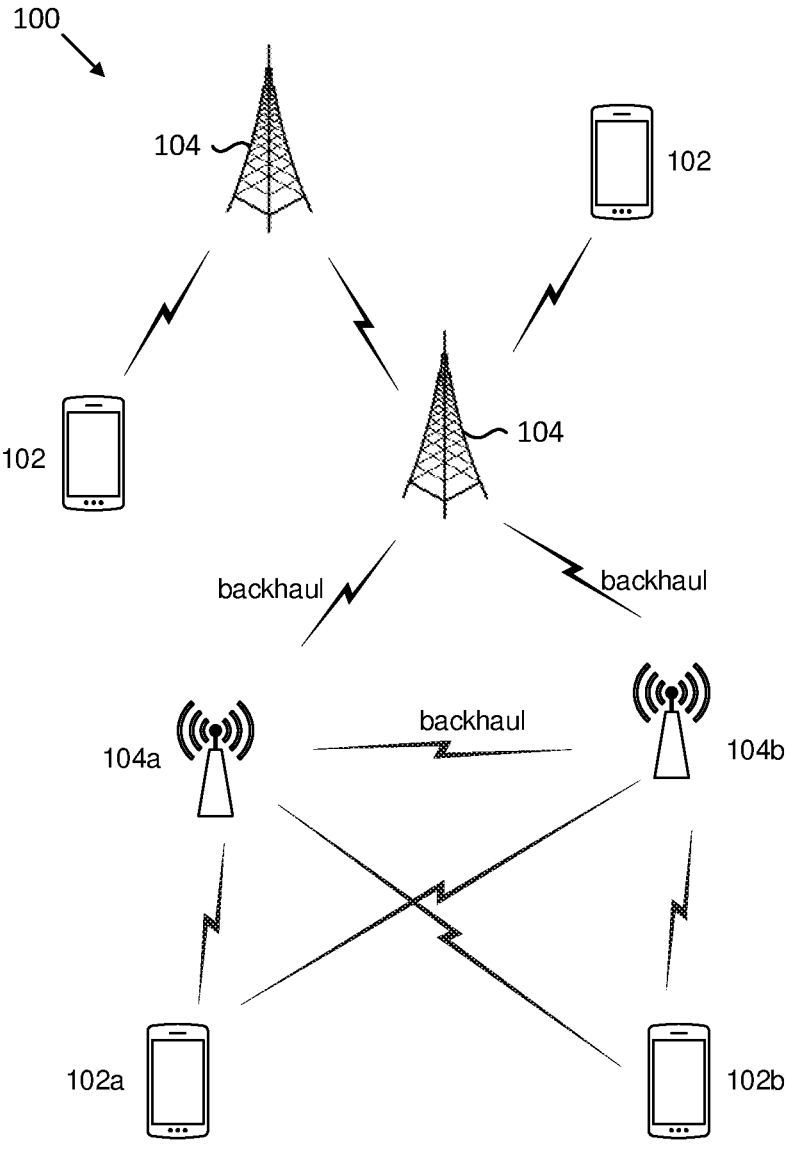
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
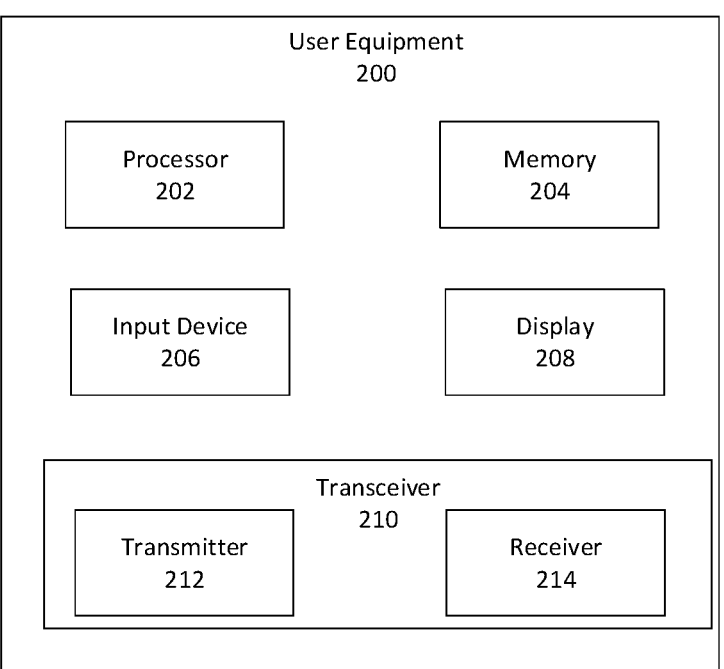
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
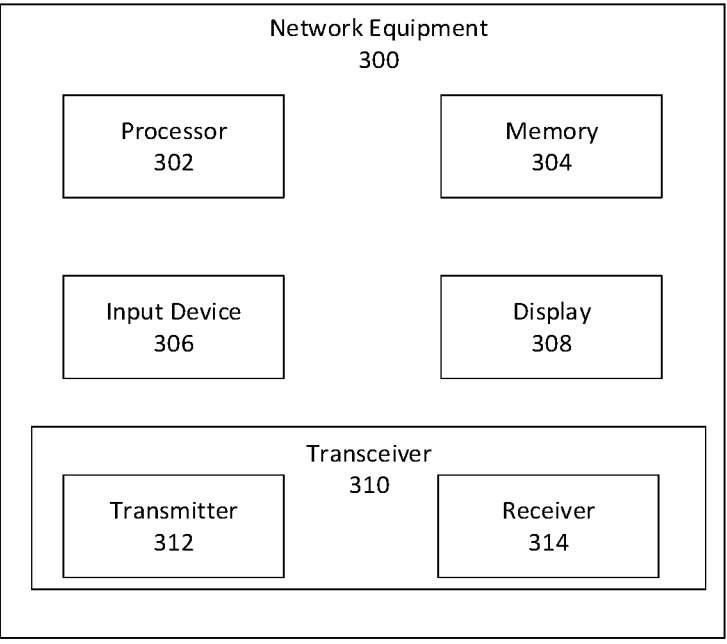
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

For multiple TRP PDCCH reliability enhancement, it is possible that non-overlapping (in the time domain) multi-chance transmitted PDCCH may be associated with different Transmission Configuration Indication (TCI) states in Time Division Multiplexing (TDM), Frequency Division Multiplexing (FDM) or SFN (Single Frequency Network) multiplexing schemes. To enable a PDCCH transmission with two TCI states, one Search Space (SS) set may be associated with two different CORESETs. Joint CORESET including two different CORESETs may be used for enhanced PDCCH transmission. Here, different TCI states are assumed for each of the CORESETs. Resources for two CORESETs may be FDMed, TDMed and even SDMed (Space Division Multiplexed) if SFN based scheme is used. In Release 15, REG-to-CCE (Resource-Element Group to Control Channel Element) resource mapping and resources for PDCCH candidates are only defined for one CORESET. The resource mapping candidate scheme for the case with the joint CORESET and the signaling design for the joint CORESET are desired.

In Release 15, elaborate resource mapping scheme is specified for PDCCH. In detail, for one UE, it can be configured with multiple CORESETs, where each CORESET consists of $N_{RB}^{CORESET}$ resource blocks in the frequency domain and $N_{symb}^{CORESET} \in \{1, 2, 3\}$ symbols in the time domain. Transmission resources in one symb CORESET are split into multiple REGs, each of which equals to one resource block (RB, or PRB) within one OFDM symbol. An REG or PRB further consists of 12 Resource Elements (REs). The REGs within a CORESET are numbered in increasing order firstly in the time domain then in the frequency domain. Six REGs form a Control Channel Element (CCE), and one or more CCEs could be aggregated for one PDCCH transmission. The supported aggregation level is shown in Table 1 below.

TABLE 1

| Supported PDCCH aggregation levels. | |
| --- | --- |
| Aggregation level | Number of CCEs |
| 1 | 1 |
| 2 | 2 |
| 4 | 4 |
| 8 | 8 |
| 16 | 16 |

Detailed information for CCE-to-REG mapping is defined as follows. The CCE-to-REG mapping for a CORESET can be interleaved or non-interleaved and is described by REG bundles:

REG bundle i is defined as REGs $\{iL, iL+1, \ldots, iL+L-1\}$ where L is the REG bundle size, $$i = 0, 1, \ldots, N_{REG}^{CORESET}/L - 1,$$

and $$N_{REG}^{CORESET} = N_{RB}^{CORESET} N_{symb}^{CORESET}$$

is the number of REGs in the CORESET;

CCE$^j$ consists of REG bundles $\{f(6j/L), f(6j/L+1), \ldots, f(6j/L+6/L-1)\}$ where $f(\bullet)$ is an interleave.

For non-interleaved CCE-to-REG mapping, L=6 and f(x)= x.

For interleaved CCE-to-REG mapping, $L \in \{2,6\}$ for $$N_{symb}^{CORESET} = 1 \text{ and } L \in \{N_{symb}^{CORESET}, 6\} \text{ for } N_{symb}^{CORESET} \in \{2, 3\}.$$

The interleaver is defined by $$f(x) = (rC + c + n_{shift}) \bmod \left(N_{REG}^{CORESET}/L\right)$$

$$x = cR + r$$

$$r = 0, 1, \ldots, R - 1$$

$$c = 0, 1, \ldots, C - 1$$

$$C = N_{REG}^{CORESET}/(LR)$$

where $R \in \{2, 3, 6\}$.

Figure 4:
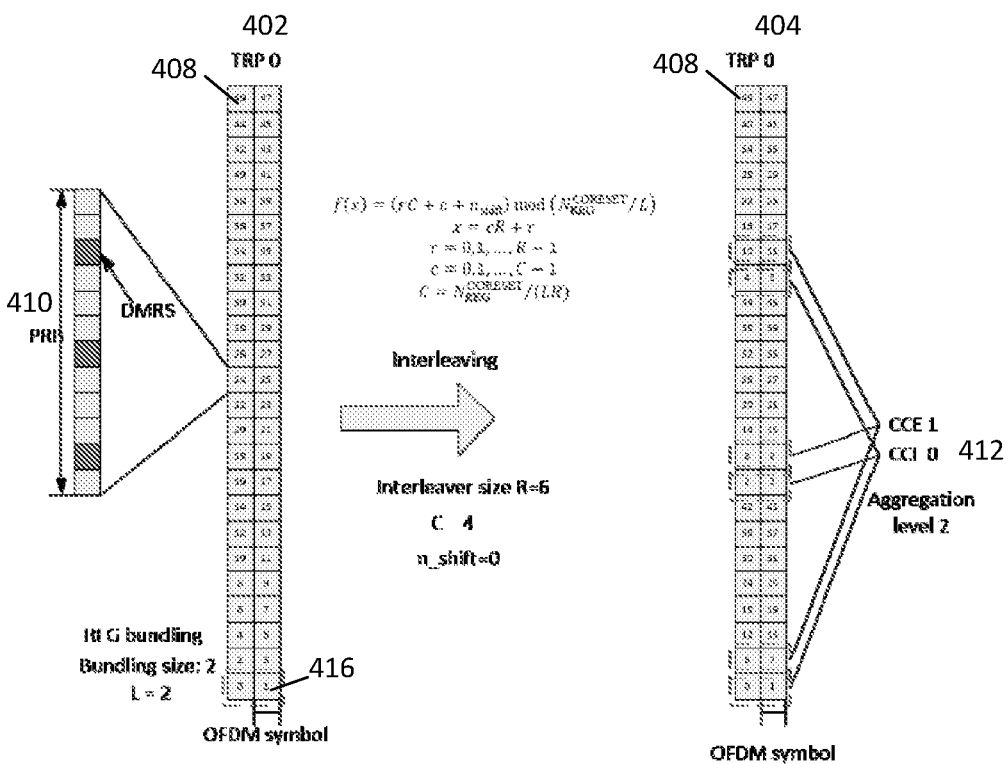
FIG. 4 is a schematic diagram illustrating an example of PDCCH resource mapping for a single TRP with interleaving in accordance with some implementations of the present disclosure.

FIG. 4 is a schematic diagram illustrating an example of PDCCH resource mapping for a single TRP with interleaving in accordance with some implementations of the present disclosure. As shown in FIG. 4, CORESET 402 consists of 24 PRBs 410 and 2 OFDM symbols. There are totally 48 REGs 408 (e.g., REGs 0, 1 . . . 47) in this CORESET. One PDCCH with aggregation level 2 uses 2 CCEs 412 (e.g. CCE 0 and CCE 1) for transmission, where each CCE 412 consists of 6 REGs 408.

REG-to-CCE mapping schemes are well defined in Release 15 for one CORESET. Each CORESET is associated with one CCE-to-REG mapping only. It may be in an interleaved or a non-interleaved mode. When the interleaved mode is configured, as shown in FIG. 4, REGs 408 of the interleaved CORESET 404 are interleaved with row-column interleaver based on the interleave size defined by a high layer configured value interleaverSize. The granularity for interleaving unit is one REG bundle 416, which may also be named as REG bundling group, where the bundling size is defined by a higher layer configured value reg-BundleSize. In this disclosure, the terms "REG bundle" and "REG bundling group" may be used interchangeably but with the same meaning.

In the example shown in FIG. 4, the REG bundling size, i.e. L, is 2 and the interleaver size is, i.e. R, is 6. Thus, one CCE consists of 6 REGs which are from 3 interleaved REG bundling groups. In detail, CCE 0 consists of interleaved REG bundling groups that are formed by REGs {0, 1}, {2, 3}, and {4, 5}. CCE 1 consists of interleaved REG bundling groups that are formed by REGs {6, 7}, {8, 9}, and {10, 11}. Other values of REG bundling size L and interleaver size R are also possible. For example, L may also be 3 or 6. When the non-interleaved mode is configured, the REGs are not interleaved and the REG bundling size is fixed as 6.

For each CORESET, the related Radio Resource Control (RRC) signaling is specified as follows.

```
ControlResourceSet ::=                                              SEQUENCE {
    controlResourceSetId                                               ControlResourceSetId,
    frequencyDomainResources                                           BIT STRING (SIZE (45)),
    duration                                                           INTEGER (1..maxCoReSetDuration),
    cce-REG-MappingType                                                CHOICE {
        interleaved                                                        SEQUENCE {
            reg-BundleSize                                                     ENUMERATED {n2, n3, n6},
            interleaverSize                                                    ENUMERATED {n2, n3, n6},
            shiftIndex
INTEGER (0..maxNrofPhysicalResourceBlocks−1)                                   OPTIONAL -- Need S
        },
        nonInterleaved                                                     NULL
    },
    precoderGranularity                                                ENUMERATED {sameAsREG-bundle,
allContiguousRBs},
    tci-StatesPDCCH-ToAddList                                          SEQUENCE (SIZE (1..maxNrofTCI-StatesPDCCH)) OF
TCI-StateId OPTIONAL, -- Cond NotSIB1-initialBWP
    tci-StatesPDCCH-ToReleaseList                                      SEQUENCE (SIZE (1..maxNrofTCI-StatesPDCCH)) OF
TCI-StateId OPTIONAL, -- Cond NotSIB1-initialBWP
    tci-PresentInDCI                                                   ENUMERATED {enabled}
OPTIONAL, -- Need S
```

-continued

```
    pdcch-DMRS-ScramblingID              INTEGER (0..65535)
OPTIONAL, -- Need S ...,
    [[
    rb-Offset-r16                        INTEGER (0..5)
OPTIONAL, -- Need N
    tci-PresentInDCI-ForDCI-Format1-2-r16    INTEGER (1..3)
OPTIONAL, -- Need S
    coresetPoolIndex-r16                 INTEGER (0..1)
OPTIONAL, -- Need R
    controlResourceSetId-r16             ControlResourceSetId-r16
OPTIONAL -- Need S
    ]]
}
-- TAG-CONTROLRESOURCESET-STOP
-- ASN1STOP
```

In Release 15 and Release 16, one Downlink Control Information (DCI) is transmitted from one CORESET and resource mapping is defined for one CORESET. For enhanced PDCCH transmission, one DCI can be transmitted from resources in multiple CORESETs from multiple TRPs. The multiple CORESETs associated with one DCI for enhanced PDCCH transmission may be collectively called the joint CORESET. Resource mapping schemes based on the joint CORESET for enhanced PDCCH transmission with multiple TRPs are proposed in the disclosure. These resource mapping schemes may include separate resource mapping scheme, concatenated resource mapping scheme and joint resource mapping scheme. Furthermore, the signaling is designed for the joint CORESET, which includes RRC signaling and Medium Access Control (MAC) Control Element (CE) signaling. The PDCCH transmission scheme may implicitly link with the joint CORESET configuration.

Resource Mapping Scheme for Joint CORESET

For enhanced PDCCH transmission, one DCI can be transmitted from a joint CORESET, where each CORESET in the joint CORESET includes resources from one TRP and associated with one TCI state. One search space is linked with the joint CORESET. The various resource mapping schemes for enhanced PDCCH transmission are explained as follows.

Separate Resource Mapping for Each CORESET

For this kind of resource mapping scheme, independent resource mapping is used for each CORESET in the joint CORESET, where the resource mapping scheme for one CORESET is the same as that specified in Release 15. One repetition for a DCI is transmitted on one CORESET. The TCI state is associated with the CORESET, and the TCI switching pattern may be implicitly determined by the CORESET switching pattern, which may be implicitly determined by the joint CORESET configuration that may include the CORESET ID, the TCI state and the repeat number (or the repetition number) of each CORESET.

PDCCH can be transmitted with a basic transmission unit as the first level and then repeat transmission is made with this basic unit to obtain the total repeat number of the PDCCH, i.e. pdcch-RepNum. For the basic transmit unit, it includes repeat transmission in the first CORESET with the number rep_Num1 and repeat transmission in the second CORESET with the number rep_Num2. For the joint CORESET, the total repeat number is configured, which is the sum of all the repeat numbers in the basic unit. The transmission order of the PDCCH between the CORESETs is implicitly determined by the order of the configured CORESETs in the joint CORESET. The CORESETs are alternatively switched after rep_Num1/rep_Num2 times of repetition.

Figure 5:
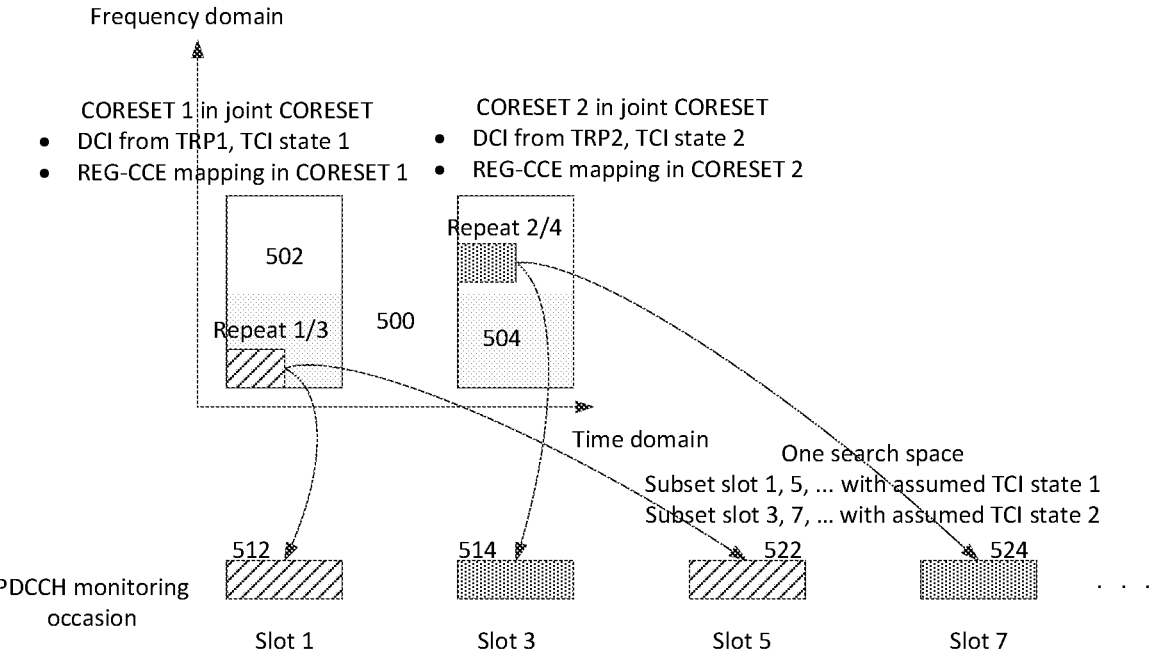
FIG. 5 is a schematic diagram illustrating an example of separate resource mapping for enhanced PDCCH transmission in accordance with some implementations of the present disclosure.

FIG. 5 is a schematic diagram illustrating an example of the separate resource mapping for enhanced PDCCH transmission in accordance with some implementations of the present disclosure. In the example, in the time-frequency domain 500, two CORESETs, CORESET 1 502 and CORESET 2 504, are in a joint CORESET. CORESET 1 502 is for one repetition of a DCI from TRP1 with TCI state 1; and CORESET 2 504 is for another repetition of the DCI from TRP2 with TCI state 2. REG-to-CCE mapping in CORESET 1 502 is independent from REG-to-CCE mapping in CORESET 2 504. As shown in FIG. 5, both rep_Num1 (for CORESET 1 502) and rep_Num2 (for CORESET 2 504) equals 1. Thus, the TCI states 1 and 2 are alternatively switched, which are associated with the CORESETs 1 and 2, respectively.

Alternatively, one subset of the search space may be associated with one CORESET. With this linkage, UE may receive multiple repetitions from multiple CORESETs in the associated search space subset. In the example shown in FIG. 5, repetitions 1 and 3 of a DCI are transmitted from CORESET 1 502 associated with TRP 1 and repetitions 2 and 4 are transmitted from CORESET 2 504 associated with TRP 2. The resource mapping for each CORESET is made separately. In the search space, one subset, e.g., subslot 1 512, subslot 5 522, ..., is used for PDCCH monitoring for repeat transmission from TRP 1 with assumed TCI state 1 and another subset, e.g. subslot 3 514, subslot 7 524, ..., is used for PDCCH monitoring for repeat transmission from TRP 2 with assumed TCI state 2.

In the separate resource mapping scheme, independent resource mapping is made for each CORESET in the joint CORESET and resources from one CORESET are used for one repeat transmission of a DCI.

The TCI state or transmission occasion of the CORESETs may be implicitly determined by the joint CORESET configuration with an ID of each CORESET, a corresponding TCI state and a repeat number. In one example, the TCI state and/or transmission occasion are implicitly determined by deriving a CORESET switching pattern with a transmission order from an order of the CORESETs in the joint CORESET configuration, and transmission times for each CORESET from a repetition number in the joint CORESET configuration. In another example, the TCI state and/or transmission occasion of the CORESETs are implicitly determined based on a subset of a search space set; the search space set is associated with the joint CORESET; and the subset of the search space set is associated with one of the CORESETs.

Concatenated Resource Mapping Among Multiple CORE-SETs

For this kind of resource mapping scheme, resources are defined in each CORESET separately and then are concatenated according to the CORESET order (i.e., the order of the CORESETs) in the joint CORESET. The resources may be concatenated based on one of concatenated units, e.g. REG, REG bundling, CCE, or CCE set. For the case which is based on the CCE set, the assumed CCE number is determined by the assumed aggregation level, which may be a predefined value, e.g. 2, 4 or 8. Alternatively, a CCE set can be all CCEs in one CORESET. The TCI state of each resource is implicitly determined based on an index of the respective REG, REG bundling, CCE, or CCE set, in the joint CORESET.

Figure 6:
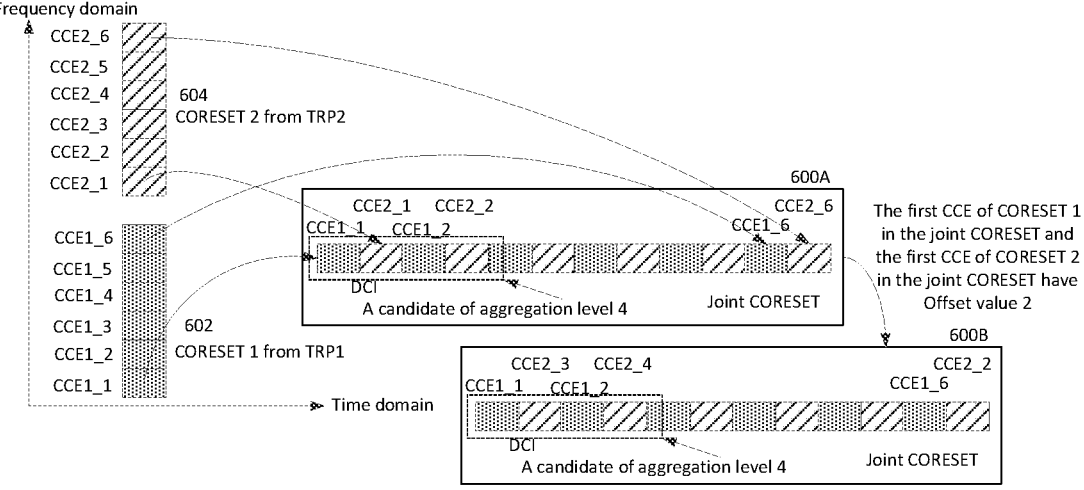
FIG. 6 is a schematic diagram illustrating an example of concatenated resource mapping for enhanced PDCCH transmission in accordance with some implementations of the present disclosure.

FIG. 6 is a schematic diagram illustrating an example of the concatenated resource mapping for enhanced PDCCH transmission in accordance with some implementations of the present disclosure. In FIG. 6, the resources are concatenated using CCE as the basic concatenation unit. Two CORESETs, CORESET 1 602 from TRP 1 and CORESET 2 604 from TRP 2, in the joint CORESET are shown; and CORESET 1 602 includes six CCEs (CCE1_1 to CCE1_6) and CORESET 2 604 includes six CCEs (CCE2_1 to CCE2_6). CCEs from CORESET 2 604 are concatenated after CCEs from CORESET 1 602. As shown in FIG. 6, in the joint CORESET 600A, CCE2_1 is concatenated after CCE1_1, CCE2_2 is concatenated after CCE1_2, and so on. For a DCI candidate, it includes resources from both TRP 1 and TRP 2, and thus a spatial/beam diversity gain may be achieved in addition to the time/frequency diversity gain. For the TCI state, it is associated with the CORESET index and may be implicitly determined by an index of the CCE in the joint CORESET. In the example shown in FIG. 6, resources from the two CORESETs are FDMed. This resource mapping scheme is also workable for TDMed CORESETs.

In the joint CORESET 600A, the same local CCE index is used for concatenation, i.e., the CCEs having the same local index (e.g., CCE1_1 and CCE2_1 having a local index of 1) in the two CORESETs are concatenated one after the other. It is possible to have one fixed offset between the indexes of the concatenation units. As an example shown in FIG. 6, the first CCE index of CORESET 1 602 in the joint CORESET 600B is 1 and the first CCE index of CORESET 2 604 in the joint CORESET 600B is 3. They have an offset value of 2, i.e., the first CCE of CORESET 1 602 in the joint CORESET 600B and the first CCE of CORESET 2 604 in the joint CORESET 600B have the offset value of 2. In the joint CORESET 600B, CCE2_3 is concatenated after CCE1_1, CCE2_4 is concatenated after CCE1_2, and so on. That is, independent starting CCE index may be used for different CORESETs in the joint CORESET. To achieve spatial diversity for each candidate, it is desirable to have the same number of concatenation units for each CORESETs in the joint CORESET (e.g. six for CORESET 1 602 and CORESET 2 604 in the example shown in FIG. 6). Otherwise, round mapping has to be used for the CORESET with a smaller concatenation unit number.

In the concatenated resource mapping scheme, resources from multiple CORESETs are concatenated in the joint CORESET based on REG, REG bundling, CCE, or CCE set according to an order of the CORESETs. The TCI state of each resource is implicitly determined based on an index of the respective REG, REG bundling, CCE, or CCE set, in the joint CORESET.

When resources are concatenated based on CCE as granularity, they may be concatenated based on an ID of the CCE with an offset value between a first one of the CORESETs and a second one of the CORESETs.

When resources are concatenated based on CCE set as granularity, the CCE set may constitute a PDCCH candidate with a specific aggregation level, or one of the CORESETs.

Joint Resource Mapping for Joint CORESET

For this kind of resource mapping scheme, it firstly rearranges REGs from the multiple CORESETs. REGs from the multiple CORESETs are concatenated according to firstly the time domain index, then the frequency domain index and lastly the CORESET index. After the REGs from the multiple CORESETs are concatenated, REG to CCE mapping is performed similar to that as specified in Release 15. For the TCI state, it is associated with the corresponding CORESET.

Figure 7A:
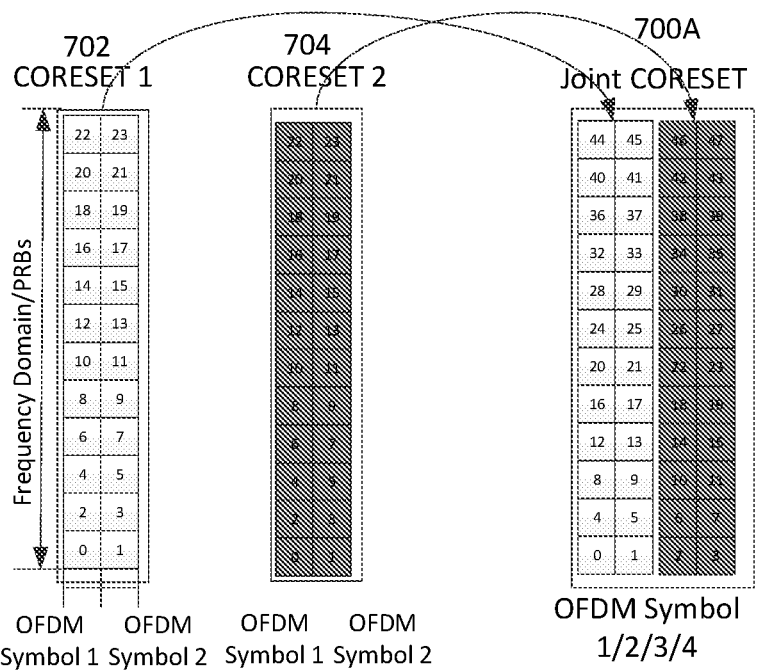
FIG. 7A is a schematic diagram of an example of joint resource mapping for enhanced PDCCH transmission in accordance with some implementations of the present disclosure.

FIG. 7A is a schematic diagram illustrating an example of the joint resource mapping for enhanced PDCCH transmission in accordance with some implementations of the present disclosure. In FIG. 7A, each of CORESET 1 702 and CORESET 2 704 consists of 12 PRBs and 2 OFDM symbols, i.e., 24 REGs. The REGs from CORESET 1 702 and CORESET 2 704 are TDMed. They are concatenated in the time domain. REG to CCE mapping is made with a CORESET duration of 4, i.e., 4 OFDM symbols. The 48 REGs (REG 0 to REG 47) are concatenated in the joint CORESET 700A as shown in FIG. 7A according to firstly the time domain index, then the frequency domain index and lastly the CORESET index. Since the joint resource mapping is used for the joint CORESET 700A, one unified Hash function is used for determining the search space. In one example, the parameters of Hash function may be determined by one of the CORESETs, e.g., the first CORESET. For the TCI state, it is implicitly determined by the REG index. For example, when mod (REG index, 4)=0 or 1, the TCI state is associated with that for TRP 1. When mod (REG index, 4)=2 or 3, the TCI state is associated with that for TRP 2.

Figure 7B:
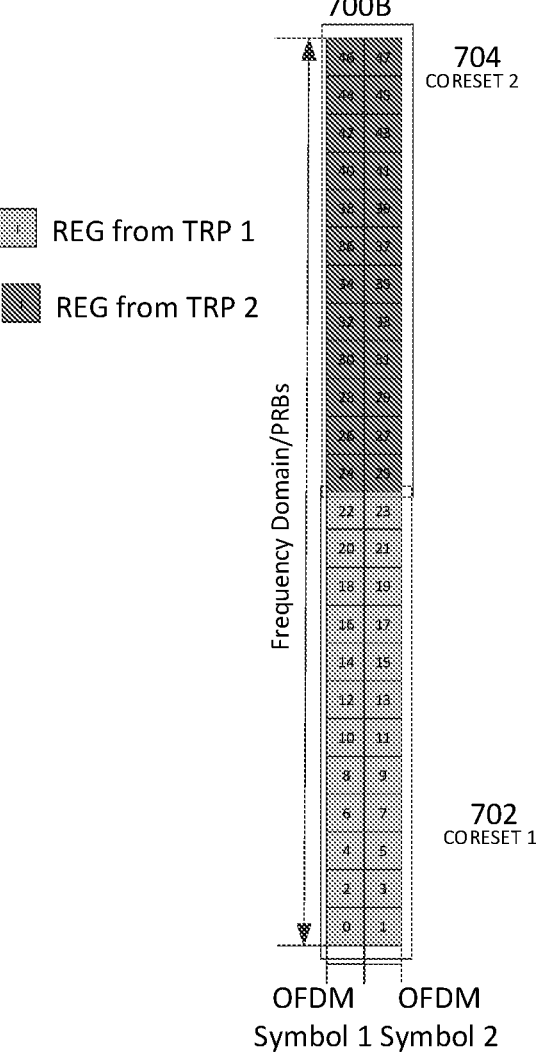
FIG. 7B is a schematic diagram of another example of joint resource mapping for enhanced PDCCH transmission in accordance with some implementations of the present disclosure.

In some other examples, resources of two CORESETs may be FDMed. The resources may be concatenated using the same principle. FIG. 7B is a schematic diagram of another example of joint resource mapping for enhanced PDCCH transmission in accordance with some implementations of the present disclosure. As shown in FIG. 7B, for example, each of CORESET 1 702 and CORESET 2 704 consists of 12 PRBs and 2 OFDM symbols, i.e., 24 REGs. The REGs from CORESET 1 702 and CORESET 2 704 are FDMed. The 48 REGs (REG 0 to REG 47) are concatenated in the joint CORESET 700B as shown in FIG. 7B. For the TCI state, it may be implicitly determined by the REG index. For example, when the REG index is less than 24, the TCI state is associated with that for TRP 1. When the REG index is greater than 24, the TCI state is associated with that for TRP 2.

From the configuration perspective, it may be better to have the same number of OFDMs and PRBs for each CORESET in the joint CORESET.

In the joint resource mapping scheme, the joint CORESET comprises REGs from multiple CORESETs concatenated according to indexes firstly in the time domain, secondly in the frequency domain, and lastly in the CORESET domain.

Signaling Design for Joint CORESET

When the joint CORESET composed of multiple CORE-SETs is configured for one DCI transmission, PDCCH from one TRP may be transmitted from one CORESET with one Transmission Configuration Indicator (TCI) state. Signaling is required to indicate the CORESETs in the joint CORESET and the corresponding repetition number. The signaling may be referred to as a configuration signaling for configuring the joint CORESET. That is, the joint CORESET configuration, which may include the CORESET ID, the TCI state and/or repetition number for each CORESET, may be included in the RRC or MAC signaling.

Figure 8A:
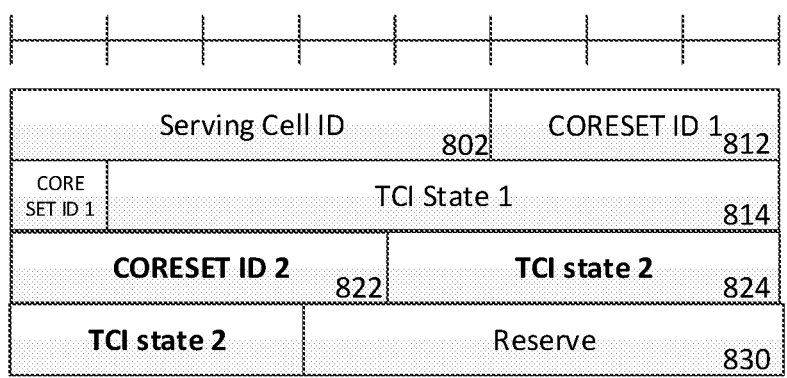
FIGS. 8A to 8C are schematic diagrams of examples of joint CORESET MAC CE indication for enhanced PDCCH in accordance with some implementations of the present disclosure.
Figure 8B:
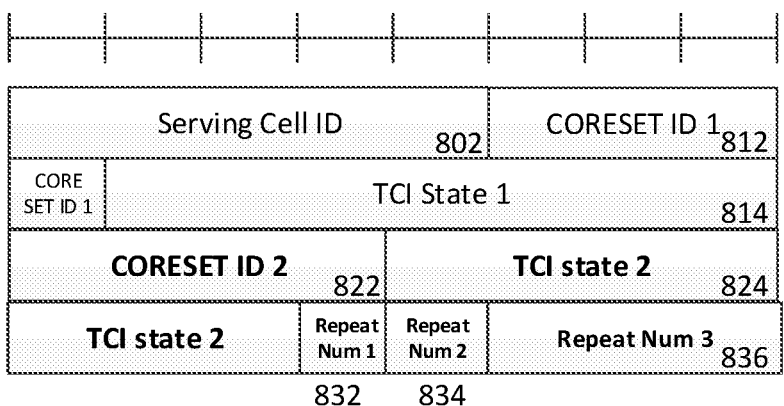

For enhanced PDCCH transmission with separate resource mapping for each CORESET, PDCCH can be transmitted with a basic transmission unit as the first level and then repeat transmission is made with this basic unit to obtain the total repeat number. The repeat number for each CORESET is also configured independently. The total repeat number may be configured for the joint CORESET. The detailed RRC signaling for the joint CORESET is shown as follows, where the adding part is marked in bold characters. The assumed TCI state may be implicitly determined based on the joint CORESET configuration as described in the separate some implementations of the present disclosure. In FIG. 8A, the MAC CE includes a Severing Cell ID 802 of 5 bits, a CORSET ID 1 812 of 4 bits, a TCI State 1 814 of 7 bits, a CORESET ID 2 822 of 4 bits, a TCI State 2 824 of 7 bits, and 3 Reserve bits 830. The IDs of CORESETs in the joint CORESET (e.g., CORESET ID 1 812, CORESET ID 2 822) and the corresponding TCI states (e.g., TCI state 1 814, TCT state 2 824) are indicated by the MAC CE for enhanced PDCCH transmission without repetition. TCI state 1 or 2 is selected from the TCI state list configured for TRP 1 or TPR 2, respectively. The MAC CE may also be used for enhanced PDCCH with the concatenated or joint resource mapping scheme. FIG. 8B shows an enhanced MAC CE with additional indication for repetition number. The field of "Repeat Num 1" 832 or "Repeat Num 2" 834 is used to indicate the repetition transmission number from CORESET 1 or 2 in a repetition unit, respectively. The field of "Repeat Num 3" 836 is used to indicate the repetition transmission number for the basic repeat unit. Alternatively, "Repeat Num 3" 836 may be used to indicate the total repetition transmission number for the flexible configuration on the repetition number. Taking TCI/CORESET switching pattern "11221122" (1 or 2 referring to the TCI state for each repeat transmission of PDCCH) as an example, there are two

---

RRC signaling design for joint CORESET

```
PDCCH-Config ::= SEQUENCE {
controlResourceSetToAddModList SEQUENCE(SIZE (1..3)) OF ControlResourceSet OPTIONAL, -- Need N
controlResourceSetCombinationToAddModList          SEQUENCE(SIZE          (1..
maxNrofControlResourceSetCombinations)) OF ControlResourceSetCombination OPTIONAL, -- Need N
controlResourceSetToReleaseList SEQUENCE(SIZE (1..3)) OF ControlResourceSetId OPTIONAL, -- Need N
controlResourceSetCombinationToReleaseList          SEQUENCE(SIZE          (1..
maxNrofControlResourceSetCombinations)) OF CombinedControlResourceCombinationSetId
OPTIONAL, -
- Need N
pdcch-RepNum       INTEGER (0..maxRepNum-1)       OPTIONAL, -- Need S
...
}
ControlResourceSetCombination ::= SEQUENCE {
controlResourceSetCombinationId       ControlResourceSetCombinationId,
controlResourceSetCombination SEQUENCE (SIZE (1..maxNrofControlResourceSetPerCombination))
OF
ControlResourceSet
repNumCombination SEQUENCE (SIZE (1..maxNrofControlResourceSetPerCombination)) OF RepNum
}
ControlResourceSetCombinationId ::= INTEGER (0..maxNrofControlResourceSetCombinations-1)
RepNum::= INTEGER (0..maxRepNum-1)
```

--- resource mapping scheme.

For enhanced PDCCH transmission with concatenated resource mapping or joint resource mapping, the basic transmission unit is composed of resources from multiple CORESETs. Thus, rep_Num1, rep_Num2 may be set to 1 as a special case. And the total repeat number, i.e., pdcch-RepNum, may be configured according to reliability requirement. The assumed TCI state may be implicitly determined as described in the concatenated resource mapping and joint resource mapping schemes.

The RRC signaling includes an information element for specifying information of the joint CORESET; and the information includes an ID of the joint CORESET, identifications of the CORESETs, and/or one or more repetition numbers.

Figure 8C:
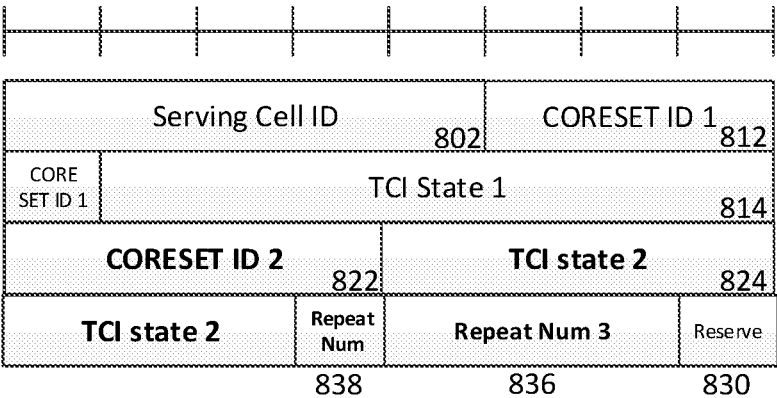

Similar signaling for the CORESET ID, TCI state and repetition number for CORESETs in the joint CORESET may be carried by an MAC CE. FIGS. 8A to 8C are schematic diagrams of examples of joint CORESET MAC CE indication for enhanced PDCCH in accordance with repetition units (or basic repetition units, "1122"); the repetition transmission numbers from CORESET 1/2 (namely, CORESET 1 and CORESET 2) in each basic repetition unit is 2/2 (namely, 2 and 2), respectively. Thus, "Repeat Num 1/2" are set to "2/2". The repetition transmission number for the basic repetition unit is 2. Thus, "Repeat Num 3" may be set to "001". In this example, "001" indicate that there are two repetitions of the repetition unit, while "000" may be used to indicate only a single transmission of the repetition unit. In some other examples, "Repeat Num 3" may be set to "010" to indicate that there are two repetitions while "001" may be used to indicate only a single transmission. Such MAC CE may be used for enhanced PDCCH with separate resource mapping with repetition.

For some cases, "Repeat Num 1" and "Repeat Num 2" may be configured as the same value to achieve equal spatial diversity. Thus, one common repeat number filed 838 may be used for indicating the repeat number for each CORESET as shown in FIG. 8C, and bits for repeat Num 2 can be saved. In addition, "Repeat Num 3" may be used to indicate the total repetition transmission number for the flexible configuration on the repetition number. For example, for TCI/CORESET switching pattern "12121" (1 or 2 refers to the TCI state for each repeat transmission), it can be realized by setting "Repeat Num" as 1 and "Repeat Num 3" as 5.

Figure 9:
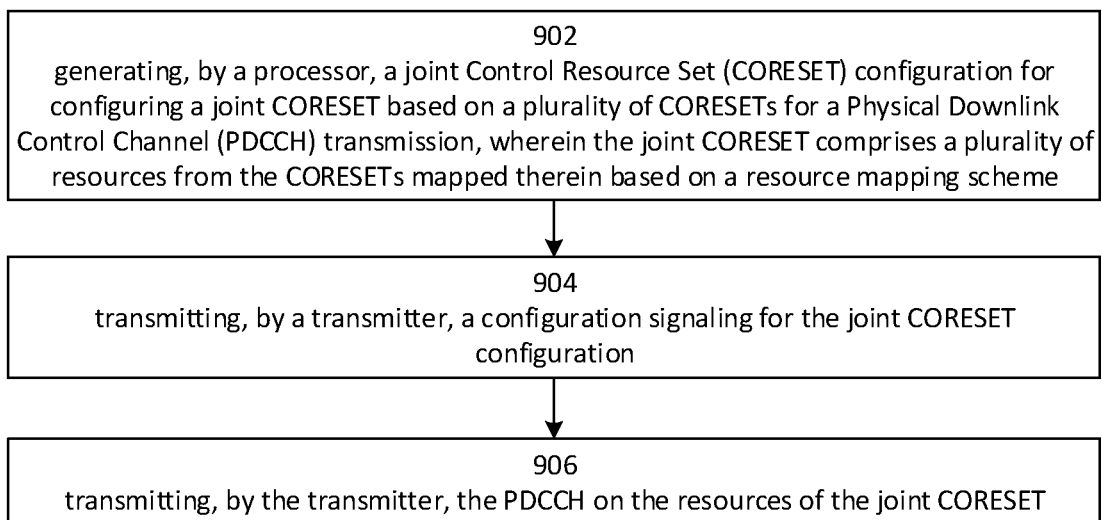
FIG. 9 is a flow chart illustrating steps of resource mapping and signaling indication for joint CORESET for enhanced PDCCH transmission with multiple TRPs by NE in accordance with some implementations of the present disclosure.

FIG. 9 is a flow chart illustrating steps of resource mapping for joint CORESET for enhanced PDCCH transmission with multiple TRPs by NE in accordance with some implementations of the present disclosure.

At step 902, the processor 302 of NE 300 generates a joint Control Resource Set (CORESET) configuration for configuring a joint CORESET based on a plurality of CORESETs for a Physical Downlink Control Channel (PDCCH) transmission, wherein the joint CORESET comprises a plurality of resources from the CORESETs mapped therein based on a resource mapping scheme.

At step 904, the transmitter 312 of NE 300 transmits a configuration signaling for the joint CORESET configuration.

At step 906, the transmitter 312 of NE 300 transmits the PDCCH on the resources of the joint CORESET.

Figure 10:
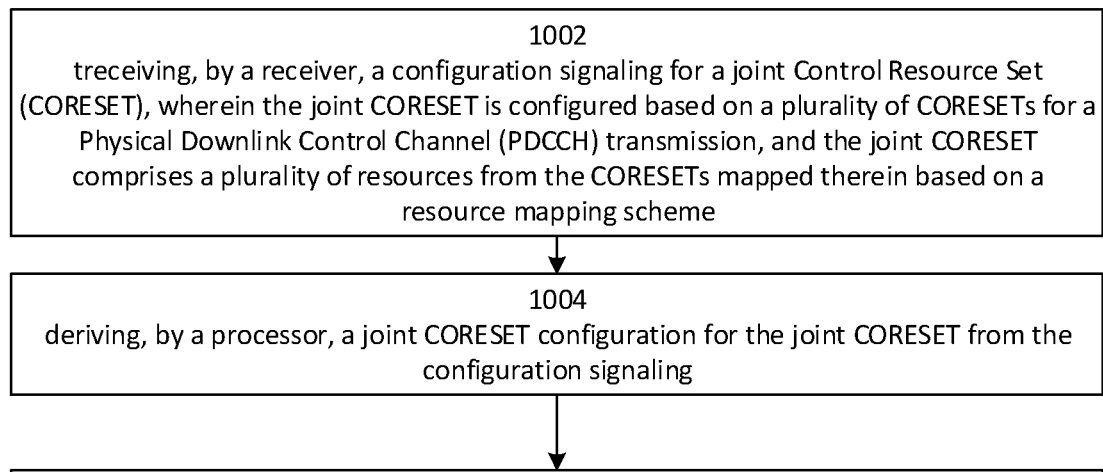
FIG. 10 is a flow chart illustrating steps of resource mapping and signaling indication for joint CORESET for enhanced PDCCH transmission with multiple TRPs by UE in accordance with some implementations of the present disclosure.

FIG. 10 is a flow chart illustrating steps of resource mapping for joint CORESET for enhanced PDCCH transmission with multiple TRPs by UE in accordance with some implementations of the present disclosure.

At step 1002, the receiver 214 of UE 200 receives a configuration signaling for a joint Control Resource Set (CORESET), wherein the joint CORESET is configured based on a plurality of CORESETs for a Physical Downlink Control Channel (PDCCH) transmission, and the joint CORESET comprises a plurality of resources from the CORESETs mapped therein based on a resource mapping scheme.

At step 1004, the processor 202 of UE 200 derives a joint CORESET configuration for the joint CORESET from the configuration signaling.

At step 1006, the receiver 214 of UE 200 further receives the PDCCH that is transmitted on the resources of the joint CORESET according to the joint CORESET configuration.

In some examples, the apparatus includes: a processor that generates a joint Control Resource Set (CORESET) configuration for configuring a joint CORESET based on a plurality of CORESETs for a Physical Downlink Control Channel (PDCCH) transmission, wherein the joint CORESET comprises a plurality of resources from the CORESETs mapped therein based on a resource mapping scheme; and a transmitter that transmits a configuration signaling for the joint CORESET configuration, and transmits the PDCCH on the resources of the joint CORESET.

In some examples, the configuration signaling comprises an ID of each CORESET, and a corresponding Transmission Configuration Indication (TCI) state of each CORESET.

In some examples, the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

In some examples, the configuration signaling is transmitted via a Radio Resource Control (RRC) signaling; the RRC signaling comprises an information element for specifying information of the joint CORESET; and the information comprises an ID of the joint CORESET, identifications of the CORESETs, and/or one or more repetition numbers.

In some examples, the configuration signaling is transmitted via a Media Access Control (MAC) Control Element (CE) of the joint CORESET; and the MAC CE comprises a plurality of IDs of the CORESETs, a plurality of TCI states of the CORESETs, and/or one or more repetition numbers.

In some examples, the resource mapping scheme comprises: independently mapping resources into each CORESET in the joint CORESET.

In some examples, a TCI state and/or transmission occasion of the CORESETs are implicitly determined based on the joint CORESET configuration.

In some examples, the TCI state and/or transmission occasion are implicitly determined by deriving a CORESET switching pattern with a transmission order from an order of the CORESETs in the joint CORESET configuration, and transmission times for each CORESET from a repetition number in the joint CORESET configuration.

In some examples, a TCI state and/or transmission occasion of the CORESETs are implicitly determined based on a subset of a search space set; the search space set is associated with the joint CORESET; and the subset of the search space set is associated with one of the CORESETs.

In some examples, the resource mapping scheme comprises: concatenating resources from the CORESETs into the joint CORESET based on Resource-Element Group (REG), REG bundling, Control Channel Element (CCE), or CCE set, according to an order of the CORESETs.

In some examples, the REG, REG bundling, CCCE or CCE set are referred to as concatenation units; and the resources from the CORESETs are concatenated based on the concatenation units with an offset between indexes of the concatenation units.

In some examples, numbers of the concatenation units for each CORESET in the joint CORESET are the same.

In some examples, round mapping is used for the CORESET with a smaller concatenation unit number in the joint CORESET.

In some examples, a TCI state of each resource is implicitly determined based on an index of the respective REG, REG bundling, CCE, or CCE set, in the joint CORESET.

In some examples, resources from the CORESETs are concatenated based on an ID of the CCE with an offset value between a first one of the CORESETs and a second one of the CORESETs.

In some examples, the CCE set constitutes a PDCCH candidate with a specific aggregation level, or one of the CORESETs.

In some examples, the resource mapping scheme comprises: concatenating REGs from the CORESETs into the joint CORESET according to, firstly an index of time domain, then an index of frequency domain, and lastly an index of CORESET domain.

In some examples, the apparatus includes: a receiver that receives a configuration signaling for a joint Control Resource Set (CORESET), wherein the joint CORESET is configured based on a plurality of CORESETs for a Physical Downlink Control Channel (PDCCH) transmission, and the joint CORESET comprises a plurality of resources from the CORESETs mapped therein based on a resource mapping scheme; and a processor that derives a joint CORESET configuration for the joint CORESET from the configuration signaling; wherein the receiver further receives the PDCCH that is transmitted on the resources of the joint CORESET according to the joint CORESET configuration.

In some examples, the configuration signaling comprises an ID of each CORESET, and a corresponding Transmission Configuration Indication (TCI) state of each CORESET.

In some examples, the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

In some examples, the configuration signaling is transmitted via a Radio Resource Control (RRC) signaling; the RRC signaling comprises an information element for specifying information of the joint CORESET; and the information comprises an ID of the joint CORESET, identifications of the CORESETs, and/or one or more repetition numbers.

In some examples, the configuration signaling is transmitted via a Media Access Control (MAC) Control Element (CE) of the joint CORESET; and the MAC CE comprises a plurality of IDs of the CORESETs, a plurality of TCI states of the CORESETs, and/or one or more repetition numbers.

In some examples, the resource mapping scheme comprises: independently mapping resources into each CORESET in the joint CORESET.

In some examples, a TCI state and/or transmission occasion of the CORESETs are implicitly determined based on the joint CORESET configuration.

In some examples, the TCI state and/or transmission occasion are implicitly determined by deriving a CORESET switching pattern with a transmission order from an order of the CORESETs in the joint CORESET configuration, and transmission times for each CORESET from a repetition number in the joint CORESET configuration.

In some examples, a TCI state and/or transmission occasion of the CORESETs are implicitly determined based on a subset of a search space set; the search space set is associated with the joint CORESET; and the subset of the search space set is associated with one of the CORESETs.

In some examples, the resource mapping scheme comprises: concatenating resources from the CORESETs into the joint CORESET based on Resource-Element Group (REG), REG bundling, Control Channel Element (CCE), or CCE set, according to an order of the CORESETs.

In some examples, the REG, REG bundling, CCCE or CCE set are referred to as concatenation units; and the resources from the CORESETs are concatenated based on the concatenation units with an offset between indexes of the concatenation units.

In some examples, numbers of the concatenation units for each CORESET in the joint CORESET are the same.

In some examples, round mapping is used for the CORESET with a smaller concatenation unit number in the joint CORESET.

In some examples, a TCI state of each resource is implicitly determined based on an index of the respective REG, REG bundling, CCE, or CCE set, in the joint CORESET.

In some examples, resources from the CORESETs are concatenated based on an ID of the CCE with an offset value between a first one of the CORESETs and a second one of the CORESETs.

In some examples, the CCE set constitutes a PDCCH candidate with a specific aggregation level, or one of the CORESETs.

In some examples, the resource mapping scheme comprises: concatenating REGs from the CORESETs into the joint CORESET according to, firstly an index of time domain, then an index of frequency domain, and lastly an index of CORESET domain.

In some examples, the method includes: generating, by a processor, a joint Control Resource Set (CORESET) configuration for configuring a joint CORESET based on a plurality of CORESETs for a Physical Downlink Control Channel (PDCCH) transmission, wherein the joint CORESET comprises a plurality of resources from the CORESETs mapped therein based on a resource mapping scheme; transmitting, by a transmitter, a configuration signaling for the joint CORESET configuration; and transmitting, by the transmitter, the PDCCH on the resources of the joint CORESET.

In some examples, the configuration signaling comprises an ID of each CORESET, and a corresponding Transmission Configuration Indication (TCI) state of each CORESET.

In some examples, the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

In some examples, the configuration signaling is transmitted via a Radio Resource Control (RRC) signaling; the RRC signaling comprises an information element for specifying information of the joint CORESET; and the information comprises an ID of the joint CORESET, identifications of the CORESETs, and/or one or more repetition numbers.

In some examples, the configuration signaling is transmitted via a Media Access Control (MAC) Control Element (CE) of the joint CORESET; and the MAC CE comprises a plurality of IDs of the CORESETs, a plurality of TCI states of the CORESETs, and/or one or more repetition numbers.

In some examples, the resource mapping scheme comprises: independently mapping resources into each CORESET in the joint CORESET.

In some examples, a TCI state and/or transmission occasion of the CORESETs are implicitly determined based on the joint CORESET configuration.

In some examples, the TCI state and/or transmission occasion are implicitly determined by deriving a CORESET switching pattern with a transmission order from an order of the CORESETs in the joint CORESET configuration, and transmission times for each CORESET from a repetition number in the joint CORESET configuration.

In some examples, a TCI state and/or transmission occasion of the CORESETs are implicitly determined based on a subset of a search space set; the search space set is associated with the joint CORESET; and the subset of the search space set is associated with one of the CORESETs.

In some examples, the resource mapping scheme comprises: concatenating resources from the CORESETs into the joint CORESET based on Resource-Element Group (REG), REG bundling, Control Channel Element (CCE), or CCE set, according to an order of the CORESETs.

In some examples, the REG, REG bundling, CCCE or CCE set are referred to as concatenation units; and the resources from the CORESETs are concatenated based on the concatenation units with an offset between indexes of the concatenation units.

In some examples, numbers of the concatenation units for each CORESET in the joint CORESET are the same.

In some examples, round mapping is used for the CORESET with a smaller concatenation unit number in the joint CORESET.

In some examples, a TCI state of each resource is implicitly determined based on an index of the respective REG, REG bundling, CCE, or CCE set, in the joint CORESET.

In some examples, resources from the CORESETs are concatenated based on an ID of the CCE with an offset value between a first one of the CORESETs and a second one of the CORESETs.

In some examples, the CCE set constitutes a PDCCH candidate with a specific aggregation level, or one of the CORESETs.

In some examples, the resource mapping scheme comprises: concatenating REGs from the CORESETs into the joint CORESET according to, firstly an index of time domain, then an index of frequency domain, and lastly an index of CORESET domain.

In some examples, the method includes: receiving, by a receiver, a configuration signaling for a joint Control Resource Set (CORESET), wherein the joint CORESET is configured based on a plurality of CORESETs for a Physical Downlink Control Channel (PDCCH) transmission, and the joint CORESET comprises a plurality of resources from the CORESETs mapped therein based on a resource mapping scheme; deriving, by a processor, a joint CORESET configuration for the joint CORESET from the configuration signaling; and receiving, by the receiver, the PDCCH that is transmitted on the resources of the joint CORESET according to the joint CORESET configuration.

In some examples, the configuration signaling comprises an ID of each CORESET, and a corresponding Transmission Configuration Indication (TCI) state of each CORESET.

In some examples, the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

In some examples, the configuration signaling is transmitted via a Radio Resource Control (RRC) signaling; the RRC signaling comprises an information element for specifying information of the joint CORESET; and the information comprises an ID of the joint CORESET, identifications of the CORESETs, and/or one or more repetition numbers.

In some examples, the configuration signaling is transmitted via a Media Access Control (MAC) Control Element (CE) of the joint CORESET; and the MAC CE comprises a plurality of IDs of the CORESETs, a plurality of TCI states of the CORESETs, and/or one or more repetition numbers.

In some examples, the resource mapping scheme comprises: independently mapping resources into each CORESET in the joint CORESET.

In some examples, a TCI state and/or transmission occasion of the CORESETs are implicitly determined based on the joint CORESET configuration.

In some examples, the TCI state and/or transmission occasion are implicitly determined by deriving a CORESET switching pattern with a transmission order from an order of the CORESETs in the joint CORESET configuration, and transmission times for each CORESET from a repetition number in the joint CORESET configuration.

In some examples, a TCI state and/or transmission occasion of the CORESETs are implicitly determined based on a subset of a search space set; the search space set is associated with the joint CORESET; and the subset of the search space set is associated with one of the CORESETs.

In some examples, the resource mapping scheme comprises: concatenating resources from the CORESETs into the joint CORESET based on Resource-Element Group (REG), REG bundling, Control Channel Element (CCE), or CCE set, according to an order of the CORESETs.

In some examples, the REG, REG bundling, CCCE or CCE set are referred to as concatenation units; and the resources from the CORESETs are concatenated based on the concatenation units with an offset between indexes of the concatenation units.

In some examples, numbers of the concatenation units for each CORESET in the joint CORESET are the same.

In some examples, round mapping is used for the CORESET with a smaller concatenation unit number in the joint CORESET.

In some examples, a TCI state of each resource is implicitly determined based on an index of the respective REG, REG bundling, CCE, or CCE set, in the joint CORESET.

In some examples, resources from the CORESETs are concatenated based on an ID of the CCE with an offset value between a first one of the CORESETs and a second one of the CORESETs.

In some examples, the CCE set constitutes a PDCCH candidate with a specific aggregation level, or one of the CORESETs.

In some examples, the resource mapping scheme comprises: concatenating REGs from the CORESETs into the joint CORESET according to, firstly an index of time domain, then an index of frequency domain, and lastly an index of CORESET domain.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. An apparatus for wireless communication, the apparatus comprising:
   a processor; and
   a memory coupled to the processor, the memory comprising instructions executable by the processor to cause the apparatus to:
      receive a configuration signaling for a joint control resource set (CORESET), wherein the joint CORESET is configured based on a plurality of CORESETs for a physical downlink control channel (PDCCH) transmission, and the joint CORESET comprises a plurality of resources from the CORESETs mapped therein based on a resource mapping scheme;
      derive a joint CORESET configuration for the joint CORESET from the configuration signaling; and
      receive the PDCCH that is transmitted on the resources of the joint CORESET according to the joint CORESET configuration, wherein the resource mapping scheme comprises: concatenating REGs from the CORESETs into the joint CORESET according to, firstly an index of time domain, then an index of frequency domain, and lastly an index of CORESET domain.

2. The apparatus of claim 1, wherein the configuration signaling comprises an identifier (ID) of each CORESET, and a corresponding transmission configuration indication (TCI) state of each CORESET.

3. The apparatus of claim 2, wherein the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

4. The apparatus of claim 1, wherein the configuration signaling is transmitted via a radio resource control (RRC) signaling; the RRC signaling comprises an information element for specifying information of the joint CORESET; and the information comprises an ID of the joint CORESET, identifications of the CORESETs, and/or one or more repetition numbers.

5. The apparatus of claim 1, wherein the configuration signaling is transmitted via a media access control (MAC) control element (CE) of the joint CORESET; and the MAC CE comprises a plurality of IDs of the CORESETs, a plurality of TCI states of the CORESETs, and/or one or more repetition numbers.

6. An apparatus for wireless communication, the apparatus comprising:
a processor; and
a memory coupled to the processor, the memory comprising instructions executable by the processor to cause the apparatus to:
receive a configuration signaling for a joint control resource set (CORESET), wherein the joint CORESET is configured based on a plurality of CORESETs for a physical downlink control channel (PDCCH) transmission, and the joint CORESET comprises a plurality of resources from the CORESETs mapped therein based on a resource mapping scheme;
derive a joint CORESET configuration for the joint CORESET from the configuration signaling; and
receive the PDCCH that is transmitted on the resources of the joint CORESET according to the joint CORESET configuration, wherein the resource mapping scheme comprises: concatenating resources from the CORESETs into the joint CORESET based on a resource element group (REG), REG bundling, control channel element (CCE), or CCE set, according to an order of the CORESETs, and wherein resources from the CORESETs are concatenated based on an ID of the CCE with an offset value between a first one of the CORESETs and a second one of the CORESETs.

7. The apparatus of claim 6, wherein the configuration signaling comprises an identifier (ID) of each CORESET, and a corresponding transmission configuration indication (TCI) state of each CORESET.

8. The apparatus of claim 7, wherein the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

9. The apparatus of claim 6, wherein the configuration signaling is transmitted via a radio resource control (RRC) signaling; the RRC signaling comprises an information element for specifying information of the joint CORESET; and the information comprises an ID of the joint CORESET, identifications of the CORESETs, and/or one or more repetition numbers.

10. The apparatus of claim 6, wherein the configuration signaling is transmitted via a media access control (MAC) control element (CE) of the joint CORESET; and the MAC CE comprises a plurality of IDs of the CORESETs, a plurality of TCI states of the CORESETs, and/or one or more repetition numbers.

11. The apparatus of claim 6, wherein a TCI state of each resource is implicitly determined based on an index of the respective REG, REG bundling, CCE, or CCE set, in the joint CORESET.

12. The apparatus of claim 6, wherein the CCE set constitutes a PDCCH candidate with a specific aggregation level, or one of the CORESETs.

13. An apparatus for wireless communication, the apparatus comprising:
a processor; and
a memory coupled to the processor, the memory comprising instructions executable by the processor to cause the apparatus to:
receive a configuration signaling for a joint control resource set (CORESET), wherein the joint CORESET is configured based on a plurality of CORESETs for a physical downlink control channel (PDCCH) transmission, and the joint CORESET comprises a plurality of resources from the CORESETs mapped therein based on a resource mapping scheme;
derive a joint CORESET configuration for the joint CORESET from the configuration signaling; and
receive the PDCCH that is transmitted on the resources of the joint CORESET according to the joint CORESET configuration, wherein the resource mapping scheme comprises: independently mapping resources into each CORESET in the joint CORESET, and wherein a TCI state and/or transmission occasion of the CORESETs are implicitly determined based on a subset of a search space set; the search space set is associated with the joint CORESET; and the subset of the search space set is associated with one of the CORESETs.

14. The apparatus of claim 13, wherein the configuration signaling comprises an identifier (ID) of each CORESET, and a corresponding transmission configuration indication (TCI) state of each CORESET.

15. The apparatus of claim 14, wherein the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

16. The apparatus of claim 13, wherein the configuration signaling is transmitted via a radio resource control (RRC) signaling; the RRC signaling comprises an information element for specifying information of the joint CORESET; and the information comprises an ID of the joint CORESET, identifications of the CORESETs, and/or one or more repetition numbers.

17. An apparatus for wireless communication, the apparatus comprising:
a processor; and
a memory coupled to the processor, the memory comprising instructions executable by the processor to cause the apparatus to:
receive a configuration signaling for a joint control resource set (CORESET), wherein the joint CORESET is configured based on a plurality of CORESETs for a physical downlink control channel (PDCCH) transmission, and the joint CORESET comprises a plurality of resources from the CORESETs mapped therein based on a resource mapping scheme;
derive a joint CORESET configuration for the joint CORESET from the configuration signaling; and receive the PDCCH that is transmitted on the resources of the joint CORESET according to the joint CORESET configuration, wherein the resource mapping scheme comprises: independently mapping resources into each CORESET in the joint CORESET, and wherein a TCI state and/or transmission occasion of the CORESETs are implicitly determined based on the joint CORESET configuration, and wherein the TCI state and/or transmission occasion are implicitly determined by deriving a CORESET switching pattern with a transmission order from an order of the CORESETs in the joint CORESET configuration, and transmission times for each CORESET from a repetition number in the joint CORESET configuration.

18. The apparatus of claim 17, wherein the configuration signaling comprises an identifier (ID) of each CORESET, and a corresponding transmission configuration indication (TCI) state of each CORESET.

19. The apparatus of claim 18, wherein the PDCCH is transmitted in a plurality of repetitions with a repetition unit, and the configuration signaling comprises a repetition number of each CORESET in the repetition unit, and/or a repetition number of the repetition unit, and/or a total repetition number of the CORESETs.

20. The apparatus of claim 17, wherein the configuration signaling is transmitted via a radio resource control (RRC) signaling; the RRC signaling comprises an information element for specifying information of the joint CORESET; and the information comprises an ID of the joint CORESET, identifications of the CORESETs, and/or one or more repetition numbers.

* * * * *